(12) United States Patent
Inoue (10) Patent No.: US 9,429,173 B2
(45) Date of Patent: Aug. 30, 2016

(54) POSITIONER

(71) Applicant: AZBIL Corporation, Tokyo (JP)

(72) Inventor: Kazuhisa Inoue, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 58 days.

(21) Appl. No.: 14/524,179

(22) Filed: Oct. 27, 2014

(65) Prior Publication Data

US 2015/0115182 A1 Apr. 30, 2015

(30) Foreign Application Priority Data

Oct. 29, 2013 (JP) ................................. 2013-224588

(51) Int. Cl.
*F15B 5/00* (2006.01)
*F16K 31/12* (2006.01)
*F15B 13/043* (2006.01)

(52) U.S. Cl.
CPC ........... *F15B 5/006* (2013.01); *F15B 13/0435* (2013.01); *F16K 31/12* (2013.01)

(58) Field of Classification Search
CPC ..... F15B 5/006; F15B 13/0435; F16K 31/12
USPC .................... 137/85, 625.66, 625.68; 91/385
See application file for complete search history.

(56) References Cited

U.S. PATENT DOCUMENTS 5,159,949 A * 11/1992 Prescott .................. F15B 5/003
137/82
2012/0247594 A1 10/2012 Inagaki

FOREIGN PATENT DOCUMENTS

JP H09-242706 9/1997
JP 2012-207746 10/2012

* cited by examiner

*Primary Examiner* — Marina Tietjen
*Assistant Examiner* — Umashankar Venkatesan
(74) *Attorney, Agent, or Firm* — Troutman Sanders LLP (57) ABSTRACT

A positioner includes: an explosion proof container containing, in an interior space, an electric circuit module and an electropneumatic converter converting, into pneumatic signals, electric signals processed by the electric circuit module; and a pneumatic amplifier, provided outside of the explosion proof container, amplifying the pneumatic signal converted by the electropneumatic converter. The explosion proof container is formed with air flow paths for the air fed into the pneumatic amplifier and the air fed out of the pneumatic amplifier, in a thick portion between inner and outer wall faces of the container that encompasses the surrounding of the interior space. The air flow paths are formed along an inner wall face of the explosion proof container. The inner wall face of the explosion proof container where on the air flow path is formed is arc-shaped or a shape that uses many curved faces of free curve shapes.

4 Claims, 13 Drawing Sheets

BACKGROUND ART

FIG. 12

BACKGROUND ART

FIG. 13

BACKGROUND ART

POSITIONER

CROSS REFERENCE TO RELATED APPLICATION

This application claims priority under 35 U.S.C. §119 to Japanese Patent Application No. 2013-224588, filed on Oct. 29, 2013, the entire content of which being hereby incorporated herein by reference.

FIELD OF TECHNOLOGY

The present invention relates to a positioner for driving a regulating valve by converting an inputted electric signal into a pneumatic pressure signal.

Figure 11:
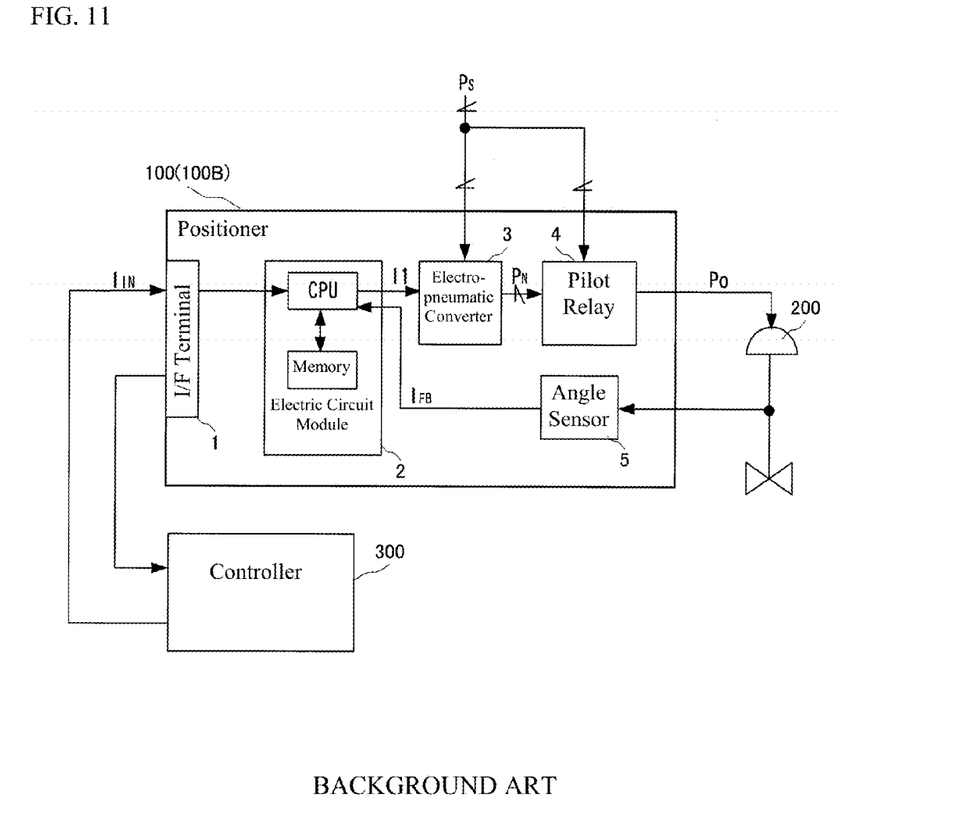
FIG. 11 is a block diagram illustrating the interior structure of a positioner that uses a single-action pilot relay.

Conventionally, for this type of positioner there have been known positioners such as illustrated by the block diagram of the internal structure thereof, in FIG. 11. See, for example, Japanese Unexamined Patent Application Publication No. H9-242706. In this figure: 1 is an I/F (interface) terminal; 2 is an electric circuit module that is structured from a CPU (Central Processing Unit), a memory and the like, 3 is an electropneumatic converter; 4 is a pilot relay (pneumatic amplifier) for amplifying the nozzle back pressure PN from the electropneumatic converter 3 and supplying it, as the output air pressure Po, to the regulator valve 200; and 5 is an angle sensor for detecting the operating position of the regulator valve 200 and feeding it back to the CPU of the electric circuit module 2, where a positioner 100 (100B) is structured therefrom.

Figure 12:
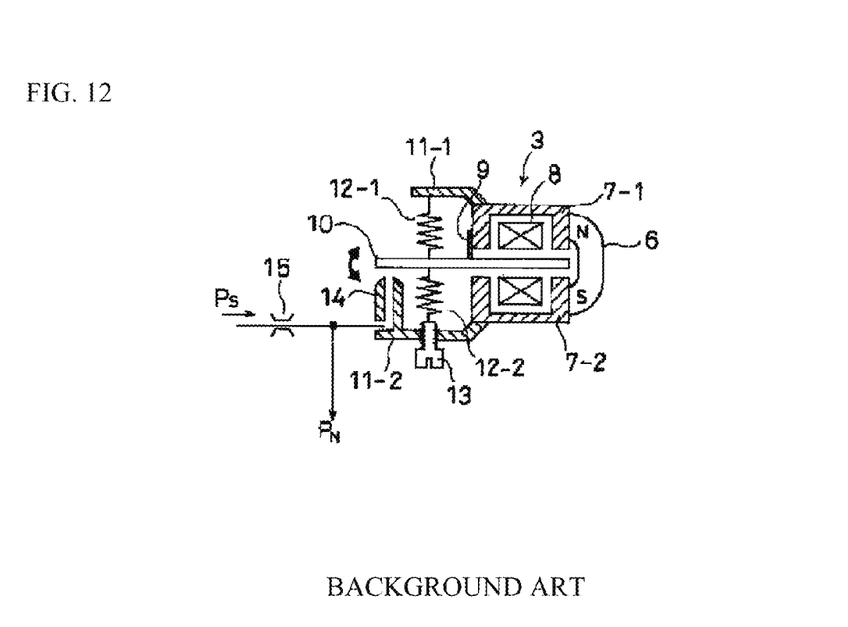
FIG. 12 is a diagram illustrating details of the electropneumatic converter in the positioner.

The electropneumatic converter 3, as illustrated in FIG. 12, for example, is structured from: a permanent magnet 6; yokes 7-1 and 7-2; a coil 8 that is disposed between the yokes 7-1 and 7-2; a flapper (armature) 10 that passes through the center of the coil 8, through disposal in the space facing the yokes 7-1 and 7-2, while maintaining an appropriate gap therebetween, with the tip end portion thereof supported, so as to be able to incline freely, by a supporting point spring (leaf spring) 9 on the yoke 7-1; a spring (for biasing) 12-1, provided between the top face of the flapper 10 and an upper stationary end 11-1; and a spring (for zero adjustment) 12-2, provided between the bottom face of the flapper 10 and an adjusting screw 13 that is screwed into a lower stationary end 11-2, wherein a nozzle 14 is in proximity to, and faces, the bottom face of the tip end of the flapper 10. Air of an air pressure (supply air pressure) Ps is supplied, from an air pressure supplying source, through a fixed constriction 15 to the nozzle 14.

In a positioner 100B that is structured in this way, when an input electric signal IIN (between 4 and 20 mA) is provided from a controller 300, that is, when the input electric signal IIN is applied to the I/F terminal 1 from the controller 300, the CPU of the electric circuit module 2 performs control calculations from the input electric signal IIN and from the feedback signal IFB, detected by the angle sensor 5, to apply, to the electropneumatic converter 3, an electric current I1 depending on the result thereof. The electric current I1 is applied to the coil 8 of the electropneumatic converter 3, to vary the magnetic field thereof, and thus the flapper 10 rotates in the direction of the nozzle or in the direction opposite from the nozzle.

Because of this, the distance of separation between the nozzle 14 and the flapper 10 changes, changing the back pressure (nozzle back pressure) PN of the nozzle 14. The nozzle back pressure PN, after being amplified by the pilot relay 4, is supplied as the output air pressure Po to the regulator valve 200, where the opening of the regulator valve 200, that is, the process flow rate, is controlled thereby. Moreover, the opening of the regulator valve 200 is detected by the angle sensor 5, and returned, as the feedback signal IFB, to the CPU of the electric circuit module 2.

This positioner 100B is required, under explosion proof standards, to have adequate explosion proof performance, so as to enable use in an explosive gas environment. Because of this, the I/F terminal 1, the electric circuit module 2, the electropneumatic converter 3, the angle sensor 5, and the like are contained within an explosion proof container. The state of containment, in the explosion proof container, of the I/F terminal 1, the electric circuit module 2, the electropneumatic converter 3, the angle sensor 5, and the like, in the positioner 100B, is illustrated in FIG. 13.

Figure 13:
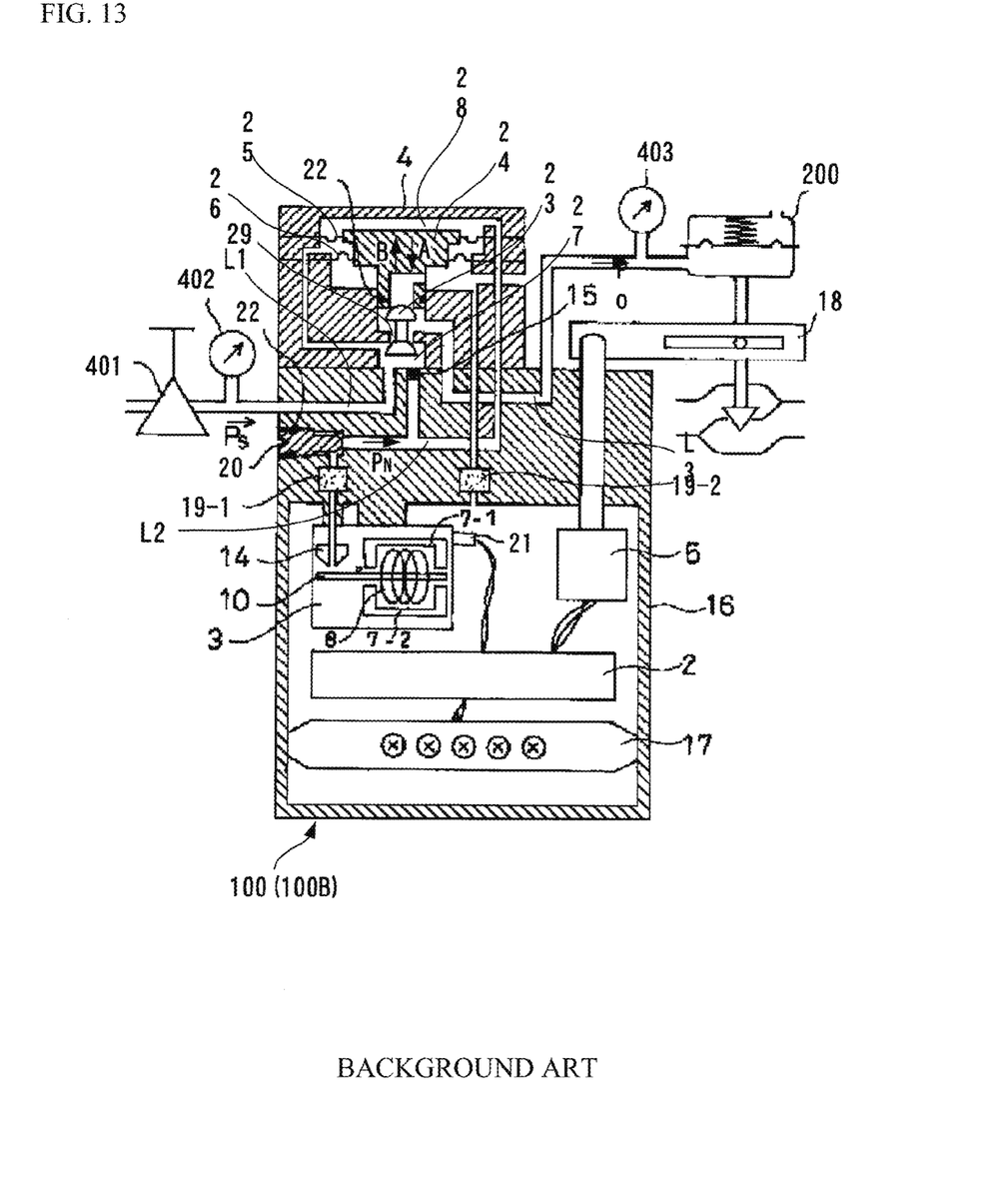
FIG. 13 is a vertical sectional diagram of a conventional positioner.

In FIG. 13, 16 is the explosion proof container, where the terminal block 17 that structures the I/F terminal 1, the electric circuit module 2, the electropneumatic converter 3, and the angle sensor 5 are contained within this explosion proof container 16. Note that in FIG. 13, the electropneumatic converter 3 is secured to the back portion of the interior surface of the explosion proof container 16, where the detailed structure is illustrated in FIG. 12, and only the structures of the critical portions are illustrated here. Moreover, in FIG. 13, the pilot relay 4 is secured to the outside of the explosion proof container 16, where air, of the supply air pressure Ps, is applied through a reduction valve 401 to the electropneumatic converter 3 and the pilot relay 4. In addition, the angle sensor 5 detects the degree of opening of the regulator valve 200, through a feedback lever 18. 402 and 403 are pressure gauges, 19-1 and 19-2 are flame arrestors, 20 is an Auto/Manual switch, 21 is a connector for connecting the electric circuit module 2 and the electropneumatic converter 3, and 22 is an O-ring.

Moreover, the explosion proof container 16 is formed with air flow paths such as a flow path L1 through which flows air of the supply air pressure Ps, a flow path L2 through which flows air of the nozzle back pressure PN, a flow path L3 through which flows air of the output air pressure Po, and the like, and the pilot relay 4 is provided with, for example, a poppet valve 23, a valve driving member 24 for driving the poppet valve 23, diaphragms 25 and 26 for holding the valve driving member 24, and the like.

In this positioner 100B, air of the supply air pressure Ps is provided to a supply air pressure chamber 27 of the pilot relay 4 through the flow path L1 of the explosion proof container 16, where the nozzle back pressure PN is guided to an input air pressure chamber 28 of the pilot relay 4 through the flow path L2 of the explosion proof container 16. When the nozzle back pressure PN increases, the diaphragms 25 and 26 move in the direction of the arrow A, pressing the valve driving member 24 downward. As a result, the poppet valve 23 is pushed down, opening a through hole 29 in the surface of the supply air pressure chamber 27, increasing the output air pressure Po on the regulator valve 200. When the nozzle back pressure PN decreases, the diaphragms 25 and 26 move in the direction of the arrow B, pushing the valve driving member 24 upward. As a result, the poppet valve 23 is pushed upward, closing the through hole 29 in the surface of the supply air pressure chamber 27, reducing the output air pressure Po that is outputted to the regulator valve 200.

However, in the structure illustrated in FIG. 13, the flow path resistance is increased, having a deleterious effect on the dynamic characteristics of the positioner, due to the air flow path that is provided separately, to the outside of the interior space of the explosion proof container, being in the form of a pipe, in combination with a straight line and a 90-degree bend. Moreover, in this structure the explosion proof container and the pneumatic circuit area are structured completely independently and separately, causing the efficiency of the distribution of the various elements within the positioner to be poor, and there are also limitations on the exterior shape, and thus there is a problem in that there is little freedom in the exterior visual design, and the exterior shape is large.

Note that in the pilot relays there are the single-action type wherein, for a single nozzle back pressure PN, a single output air pressure Po is outputted, and a double-action type wherein, for a single nozzle back pressure PN, two different output pressures Po1 and Po2 are outputted. See, for example, Japanese Unexamined Patent Application Publication No. 2012-207746. In the double-action pilot relay, when the regulator valve is caused to undergo forward operation, the output air pressure Po1 is caused to be higher than Po2, and when undergoing reverse operation, the output air pressure Po2 is higher than Po1. While FIG. 13 shows the structure for the case of a single-action pilot relay, a double-action pilot relay would require two air flow path systems adjacent to the explosion proof container, and thus the interior shape would be larger than that of the single-action type and the pneumatic circuit structure would also be more complex, making the exterior visual design more difficult, when considering design properties, and causing the combination of the straight line and the 90° bend in the pneumatic circuit to have a complex structure, further increasing the flow path resistance, and having a deleterious impact on the controllability of the positioner.

The present invention was created in order to solve such problems, and an aspect thereof is to provide a positioner having an explosion proof container structure that is able to reduce the flow path resistance of the pneumatic circuit along with increasing the freedom in the exterior visual design, while increasing the efficiency of the placement of the various elements within the positioner.

SUMMARY

The present invention, in order to achieve the aspect set forth above, a positioner for driving a regulator valve by converting an inputted electric signal into a pneumatic signal, includes: an electric circuit module that processes electric signals; an electropneumatic converter that converts, into pneumatic signals, electric signals that have been processed by the electric circuit module; an explosion proof container that contains, in an interior space, the electric circuit module and the electropneumatic converter; and a pneumatic amplifier, provided outside of the explosion proof container, that amplifies the pneumatic signal converted by the electropneumatic converter. The explosion proof container is formed with air flow paths for the air that is fed into the pneumatic amplifier and the air that is fed out of the pneumatic amplifier, in a thick portion between an inner wall face and an outer wall face of the container that encompasses the surrounding of the interior space. The air flow paths are formed along an inner wall face of the explosion proof container. The inner wall face of the explosion proof container where on the air flow path is formed is arc-shaped or a shape that uses many curved faces of free curve shapes.

In this invention, air flow paths are formed along an inner wall face that is shaped as an arc, for example, in a thick portion between the inner wall face and the outer wall face of the explosion proof container. In this case, the entirety of the inner wall face need not necessarily be formed in arc shapes. That is, only one portion need be formed as an arc shape, with the air flow path formed along with the inner wall face that is formed as the arc shape. This reduces the curves in the air flow path in the explosion proof container, causing the air flow path to be smooth, producing a flow path shape wherein there is little variation in the cross-sectional area, thereby reducing the flow path resistance.

Note that, in the present invention, the air flow path is provided with a resonator that reduces the flow path resistance before or after a part wherein the flow path resistance is large, such as a part with a sharp bend such as being bent at a right angle or being bent back sharply, a part wherein there is a rapid change in cross-sectional area, a part wherein there is a small cross-sectional area, or the like. For example, the cross-sectional area of the flow path can be secured, and the flow path resistance can be reduced, through the provision of an air reservoir as a resonator in the air flow path.

Because, in the present invention, the air flow paths are formed along the interior wall face in arc shapes or in shapes that use many free curve-shaped curved faces, in a thick portion between the inner wall face and the outer wall face of the explosion proof container, that is, because the explosion proof container is integrated with the pneumatic circuit parts as a two-layer structure, the efficiency with which the various components within the positioner are disposed can be increased, and the flexibility in the external visual design can be increased as well. For example, the outer wall face of the explosion proof container may be used as one portion of the exterior shape of the positioner, and the exterior shape of the positioner can be formed in a streamlined shape, making it possible to both reduce the flow path resistance and improve the external visual design.

Because, in the present invention, the airflow paths are formed along the interior wall face in arc shapes or in shapes that use many free curve-shaped curved faces, in a thick portion between the inner wall face and the outer wall face of the explosion proof container, the flow path resistance is low and the flexibility for the exterior visual design is high in the explosion proof container, enabling a reduction in the flow path resistance and an improvement in the external visual design, and also enabling a reduction in the exterior size.

DETAILED DESCRIPTION

Examples according to the present disclosure will be explained below in detail, based on the drawings.

Figure 1:
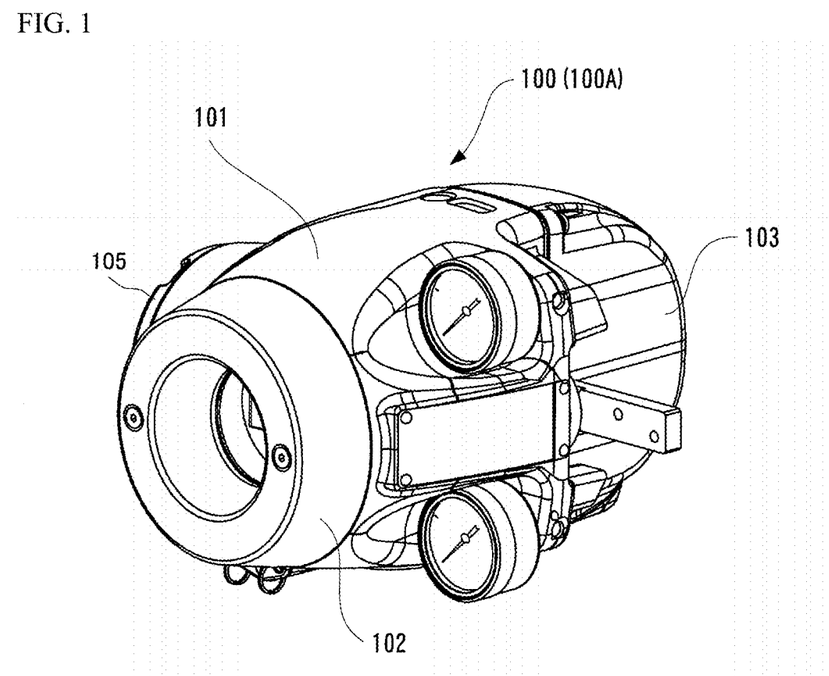
FIG. 1 is an exterior perspective diagram illustrating an example of a positioner according to the present invention.

FIG. 1 is an exterior perspective diagram illustrating an example of a positioner according to the present invention. In this positioner 100 (100A), the exterior shape is of a streamlined shape, with a distinctive exterior visual design that has not existed heretofore.

Figure 3:
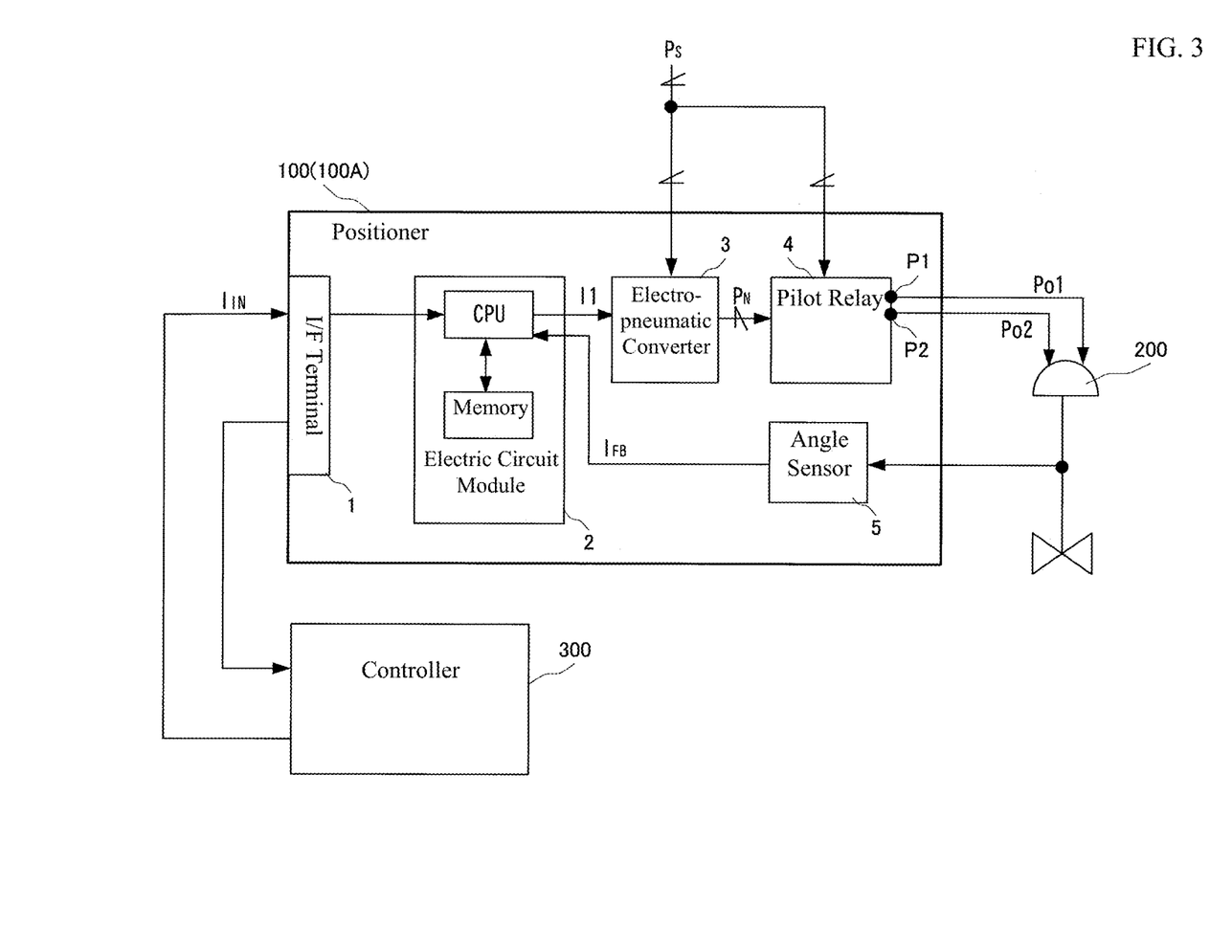
FIG. 3 is a block diagram illustrating the interior structure of this positioner (a positioner that uses a double-action pilot relay).

FIG. 3 shows a block diagram of the interior structure of this positioner 100A. In FIG. 3, the structural elements that are identical or equivalent to the structural elements explained in reference to FIG. 11 are indicated by codes that are identical to those of FIG. 11, and explanations thereof are omitted.

In this positioner 100A, a double-action pilot relay, defined as pilot relay 4, is used. This double-action pilot relay 4 has two output ports, where if the regulator valve 200 is undergoing forward operation, the output air pressure Po1 of the first output port P1 is higher than the output air pressure Po2 of the second output port P2, and when undergoing reverse operation, the output air pressure Po2 of the second output port P2 is higher than the output air pressure Po1 of the first output port P1.

In this positioner 100A, the I/F (interface) terminal 1, the electric circuit module 2, the electropneumatic converter 3, and the angle sensor 5 are contained within the interior space of the case 101 (FIG. 1). That is, an explosion proof container is used for the case 101 (where, in the below, the case 101 will be termed an "explosion proof container"), where the I/F (interface) terminal 1, the electric circuit module 2, the electric pneumatic converter 3, and the angle sensor 5 are contained within this explosion proof container 101.

Figure 2:
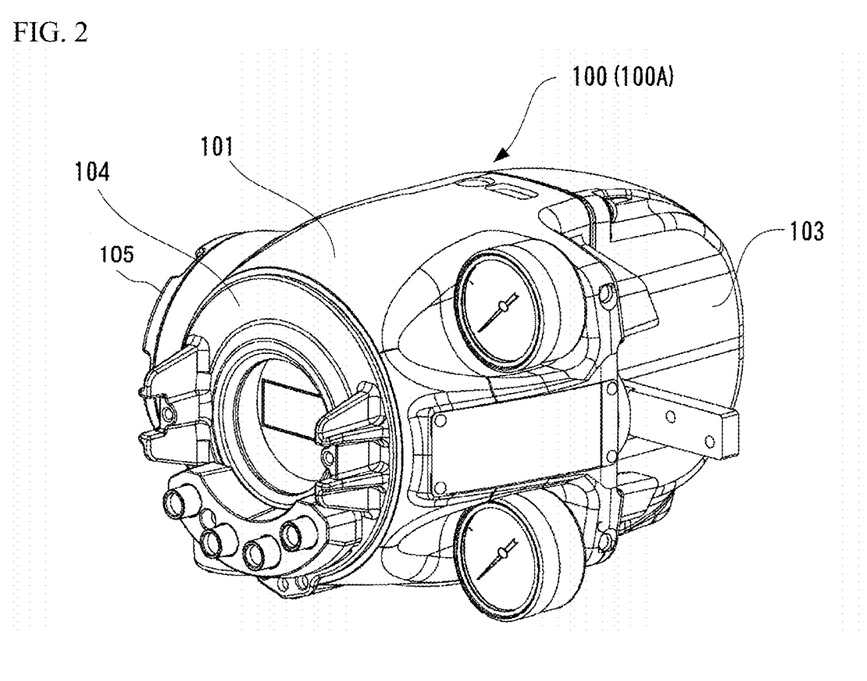
FIG. 2 is a diagram illustrating the state wherein the cover, provided on the front face of the positioner, has been removed.

In this explosion proof container 101, a cover 102 is attached to the front face thereof, and, as illustrated in FIG. 2, when this cover 102 is removed, the main cover 104, which is a portion of the explosion proof container 101, is visible. Moreover, a cover 103 is attached to the back face of the explosion proof container 101, where the double-action pilot relay 4 is attached in the space that is covered by this cover 103.

Figure 4:
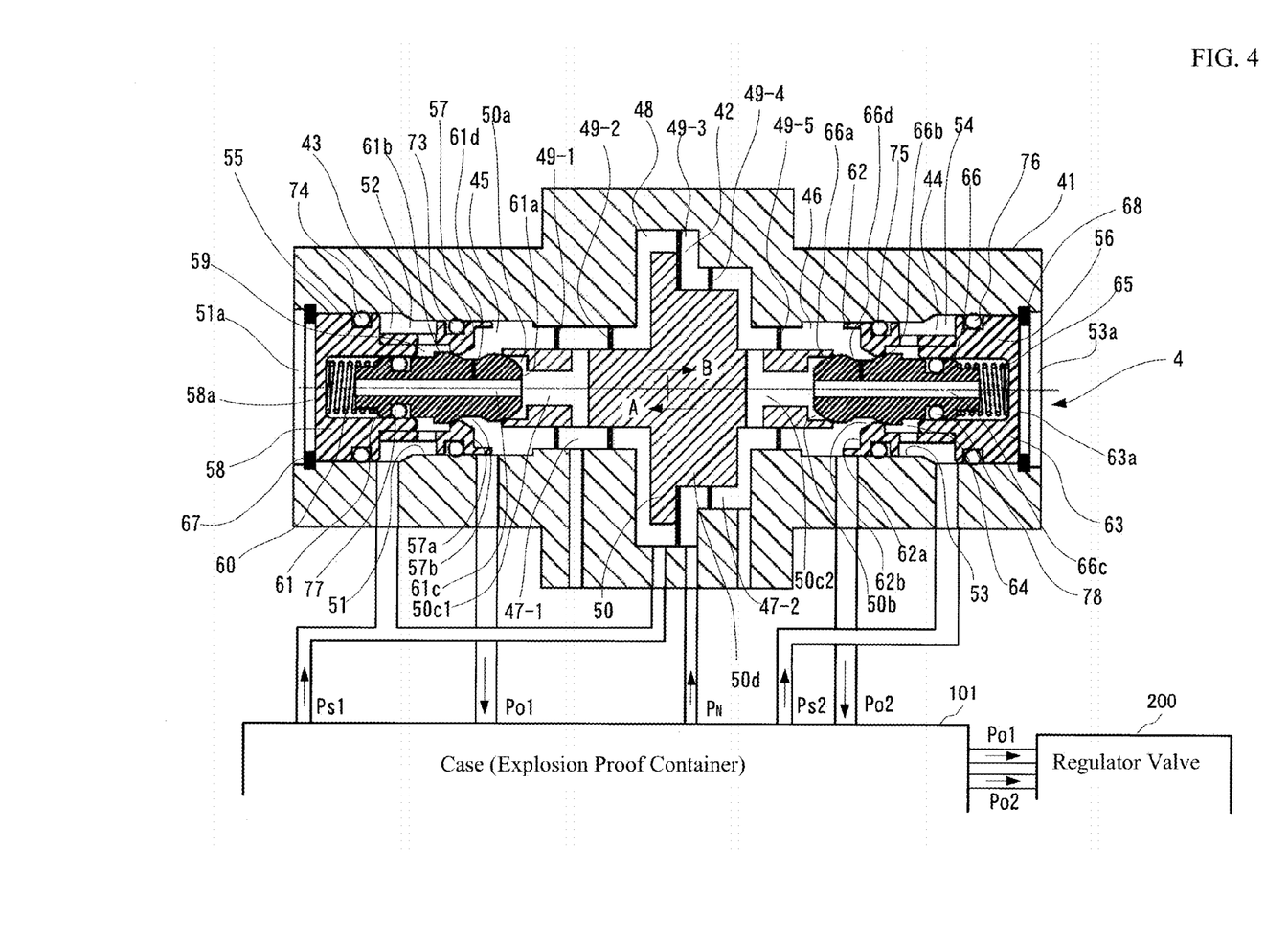
FIG. 4 is a diagram illustrating the structure of the double-action pilot relay in this positioner.

A structure of a double-action pilot relay 4 is illustrated in FIG. 4. In this figure, 41 is a housing, where an input air pressure chamber 42, a first supply air pressure chamber 43, a second supply air pressure chamber 44, a first output air pressure chamber 45, a second output air pressure chamber 46, a first discharge air chamber 47-1, a second discharge air chamber 47-2, and a biasing chamber 48 are provided within the housing 41.

In this housing 41, the first discharge air chamber 47-1 is adjacent to the first output air pressure chamber 45 with a first diaphragm 49-1 interposed therebetween, and adjacent to the biasing chamber 48 with a second diaphragm 49-2 interposed therebetween. Moreover, the input air pressure chamber 42 is adjacent to the bias chamber 48 with a third diaphragm 49-3 interposed therebetween, and adjacent to a second discharge air chamber 47-2 with a fourth diaphragm 49-4 interposed therebetween. Moreover, the second discharge air chamber 47-2 is adjacent to the second output air pressure chamber 46 with a fifth diaphragm 49-5 interposed therebetween. The first through fifth diaphragms 49-1 through 49-5 are provided between the housing 41 and a spool (movable body) 50, where the spool 50 is supported by these first through fifth diaphragms 49-1 through 49-5 so as to be able to move in the direction of the arrow A and in the direction of the arrow B.

The spool 50 has a first opening 50a that is located at the first output air pressure chamber 45, a second opening 50b that is located at the second output air pressure chamber 46, a first discharge air duct 50c1 for connecting a first opening 50a to the first discharge air chamber 47-1, and a second discharge air duct 50c2 for connecting a second opening 50b to the second discharge air chamber 47-2. In the spool 50, the first discharge air duct 50c1 and the second discharge air duct 50c2 are divided by a non-duct portion 50d.

Moreover, at the end portion on one side of the housing 41, a duct 51 wherein the opening portion 51a thereof faces the outside of the housing 41 is provided as a first poppet valve assembly installing portion 52, and at the end portion on the other side of the housing 41, a duct 53 wherein the opening portion 53a thereof faces the outside of the housing 41 is provided as a second poppet valve assembly installing portion 54.

A first poppet valve assembly 55 is installed slidably, along the inside wall face of the duct 51, from the opening portion 51a of the duct 51 that faces the outside of the housing 41 into the first poppet valve assembly installing portion 52, where the space remaining at the bottom portion of the duct 51 is defined as the first output air pressure chamber 45. A second poppet valve assembly 56 is installed slidably, along the inside wall face of the duct 53, from the opening portion 53a of the duct 53 that faces the outside of the housing 41, into the second poppet valve assembly installing portion 54, where the space remaining at the bottom portion of the duct 53 is defined as the second output air pressure chamber 46.

The first poppet valve assembly 55 is a divided structure of a cylindrical pipe seat portion 57 and a cylindrical column seat retaining portion 58, having the seat portion 57 attached removably to the front face thereof, where an interior space 59 is formed between the seat portion 57 and the seat retaining portion 58. A first connecting hole 57b for connecting between the interior space 59 and the first output air pressure chamber 45 is formed in the top face 57a of the seat portion 57. This top face 57a of the seat portion 57 fulfills the role as a first dividing wall for partitioning between the first supply air pressure chamber 43 and the first output air pressure chamber 45.

A first spring 60 is contained in the interior space 59 between the seat portion 57 and the seat retaining portion 58, where the first poppet valve 61 is held between the seat portion 57 and the seat retaining portion 58 in a state wherein the first spring 60 is stressed. The interior space 59 is connected to the first supply air pressure chamber 43. The first poppet valve 61 has a discharge air valve 61a at the tip end portion thereof, and a supply air valve 61b to the rear of the discharge air valve 61a. Moreover, the first poppet valve 61 has a through hole 61c that passes through the axis thereof.

In this held state, the first poppet valve 61 penetrates through the first connecting hole 57b that is formed in the seat portion 57, and is biased by the first spring 60 so as to be able to move to the left and right. Moreover, the supply air valve 61b is biased in the direction so as to close the first connecting hole 57*b*, and the discharge air valve 61*a* protrudes from the first connecting hole 57*b*. Note that a fine connecting duct 61*d* that connects to the through hole 61*c* that is formed on the interior of the first poppet valve 61 is formed between the discharge air valve 61*a* and the supply air valve 61*b* of the first poppet valve 61.

The second poppet valve assembly 56 is also structured identically to the first poppet valve assembly 55. That is, the second poppet valve assembly 56 is a divided structure of a cylindrical pipe seat portion 62 and a cylindrical column seat retaining portion 63, having the seat portion 62 attached removably to the front face thereof, where an interior space 64 is formed between the seat portion 62 and the seat retaining portion 63. A second connecting hole 62*b* for connecting between the interior space 64 and the second output air pressure chamber 46 is formed in the top face 62*a* of the seat portion 62. This top face 62*a* of the seat portion 62 fulfills the role as a second dividing wall for partitioning between the second supply air pressure chamber 44 and the second output air pressure chamber 46.

A second spring 65 is contained in the interior space 64 between the seat portion 62 and the seat retaining portion 63, where the second poppet valve 66 is held between the seat portion 62 and the seat retaining portion 63 in a state wherein the second spring 65 is stressed. The interior space 64 is connected to the second supply air pressure chamber 44. The second poppet valve 66 has a discharge air valve 66*a* at the tip end portion thereof, and a supply air valve 66*b* to the rear of the discharge air valve 66*a*. Moreover, the second poppet valve 66 has a through hole 66*c* that passes through the axis thereof.

In this held state, the second poppet valve 66 penetrates through the second connecting hole 62*b* that is formed in the seat portion 62, and is biased by the second spring 65 so as to be able to move to the left and right. Moreover, the supply air valve 66*b* is biased in the direction so as to close the second connecting hole 62*b*, and the discharge air valve 66*a* protrudes from the second connecting hole 62*b*. Note that a fine connecting duct 66*d* that connects to the through hole 66*c* that is formed on the interior of the second poppet valve 66 is formed between the discharge air valve 66*a* and the supply air valve 66*b* of the second poppet valve 66.

After attaching the first poppet valve assembly 55 to the first poppet valve assembly installing portion 52, that is, after the first poppet valve assembly 55 is pushed into the duct 51 from the opening portion 51*a* that faces the outside of the housing 41, in relation to this first poppet valve assembly 55, a ring-shaped stopper plate 67 is attached to the opening portion 51*a* of the duct 51. That is, the ring surface of the stopper plate 67 is put into facial contact with the surface of the first poppet valve assembly 55 that faces the outside of the housing 41 (the bottom face 58*a* of the seat retaining portion 58), to control the location of the first poppet valve assembly 55 in the first poppet valve assembly installing portion 52.

Similarly, after attaching the second poppet valve assembly 56 to the second poppet valve assembly installing portion 54, that is, after the second poppet valve assembly 56 is pushed into the duct 53 from the opening portion 53*a* that faces the outside of the housing 41, in relation to this second poppet valve assembly 56 as well, a ring-shaped stopper plate 68 is attached to the opening portion 53*a* of the duct 53. That is, the ring surface of the stopper plate 68 is put into facial contact with the surface of the second poppet valve assembly 56 that faces the outside of the housing 41 (the bottom face 63*a* of the seat retaining portion 63), to control the location of the second poppet valve assembly 56 in the second poppet valve assembly installing portion 54.

In this double-action pilot relay 4, air at the supply air pressure Ps 1 is supplied to the first supply air pressure chamber 43 and the biasing chamber 48 through the explosion proof container 101, and air of the supply air pressure Ps1 is supplied to the second supply air pressure chamber 44, so the air with the nozzle back pressure PN is directed to the input air pressure chamber 42. Moreover, air of the output air pressure Po1 is supplied to the regulator valve 200 through the explosion proof container 101 from the first output air pressure chamber 45, and air of the output air pressure Po2 is supplied to the regulator valve 200 through the explosion proof container 101 from the second output air pressure chamber 46.

Note that the first discharge air chamber 47-1 and the second discharge air chamber 47-2 are connected to atmosphere, and O-rings 73 and 74 are provided between the housing 41 and the seat portion 57 and the seat retaining portion 58 of the first poppet valve assembly 55. Additionally, O-rings 75 and 76 are provided between the housing 41 and the seat portion 62 and the seat retaining portion 63 of the second poppet valve assembly 56. Moreover, in the first poppet valve assembly 55, an O-ring 77 is installed between the first poppet valve 61 and the seat retaining portion 58, and in the second poppet valve assembly 56, an O-ring 78 is installed between the second poppet valve 66 and the seat retaining portion 63.

In this double-action pilot relay 4, when the nozzle back pressure PN is increased, the diaphragms 49-1 through 49-5 move in the direction of the arrow A, and, accordingly, the spool 50 that is supported on the diaphragms 49-1 through 49-5 also moves to the side of the arrow A. At this time, the spool 50, through this movement, presses the first poppet valve 61 downward against the biasing force of the first spring 60, and, as a result, the supply air valve 61*b* of the first poppet valve 61 opens the first connecting hole 57*b*. At this time, the first opening 50*a* of the spool 50 is closed by the discharge air valve 61*a* of the first poppet valve 61. On the other hand, the second poppet valve 66 is pushed upward by the biasing force of the second spring 65, and, accordingly, the supply air valve 66*b* of the second poppet valve 66 closes the second connecting hole 62*b*. At this time, the second opening 50*b* of the spool 50 is opened by the discharge air valve 66*a* of the second poppet valve 66.

As a result, the air of the supply air pressure Ps1 that is supplied to the first supply air pressure chamber 43 through the explosion proof container 101 enters into the interior space 59 of the first poppet valve assembly 55, and after entering into the first output air pressure chamber 45, through the first through hole 57*b*, is sent to the explosion proof container 101 as air at the output air pressure Po1, to be supplied to the regulator valve 200 through the explosion proof container 101. On the other hand, after the air from the regulator valve 200 returns into the second output air pressure chamber 46 through the explosion proof container 101, it enters into the discharge air duct 50*c*2 through the second opening 50*b* of the spool 50, to be discharged into the discharge air chamber 47-2.

On the other hand, when the nozzle back pressure PN is decreased, the diaphragms 49-1 through 49-5 move to the side of the arrow B, and, concomitantly, the spool 50 that is supported on the diaphragm 49 moves to the side of the arrow B. At this time, the spool 50, through this movement, presses the second poppet valve 66 downward against the biasing force of the second spring 65, and, as a result, the supply air valve 66*b* of the second poppet valve 66 opens the second connecting hole 62b. At this time, the second opening 50b of the spool 50 is closed by the discharge air valve 66a of the second poppet valve 66. On the other hand, the first poppet valve 61 is pushed upward by the biasing force of the first spring 60, and, accordingly, the supply air valve 61b of the first poppet valve 61 closes the first connecting hole 57b. At this time, the first opening 50a of the spool 50 is opened by the discharge air valve 61a of the first poppet valve 61.

As a result, the air of the supply air pressure Ps2 that is supplied to the second supply air pressure chamber 44 through the explosion proof container 101 enters into the interior space 64 of the second poppet valve assembly 56, and after entering into the second output air pressure chamber 46, through the second connecting hole 62b, is sent to the explosion proof container 101 as air at the output air pressure Po2, to be supplied to the regulator valve 200 through the explosion proof container 101. On the other hand, after the air from the regulator valve 200 returns into the first output air pressure chamber 45 through the explosion proof container 101, it enters into the discharge air duct 50c1 through the first opening 50a of the spool 50, to be discharged into the discharge air chamber 47-1.

In this way, the spool 50 and the pair of poppet valves 61 and 66 is operated by the nozzle back pressure PN that is directed into the input air pressure chamber 42 through the explosion proof container 101, where this operation causes the amplified output air pressures Po1 and Po2 to be outputted to the regulator valve 200 through the explosion proof container 101. In this case, the output air pressure Po1 can be adjusted through adjusting the pressure of the nozzle back pressure PN in the increasing direction when operating the regulator valve 200 in the forward direction, and the output air pressure Po2 can be adjusted through adjusting the pressure of the nozzle back pressure PN in the decreasing direction when operating the regulator valve 200 in the reverse direction.

Figure 5:
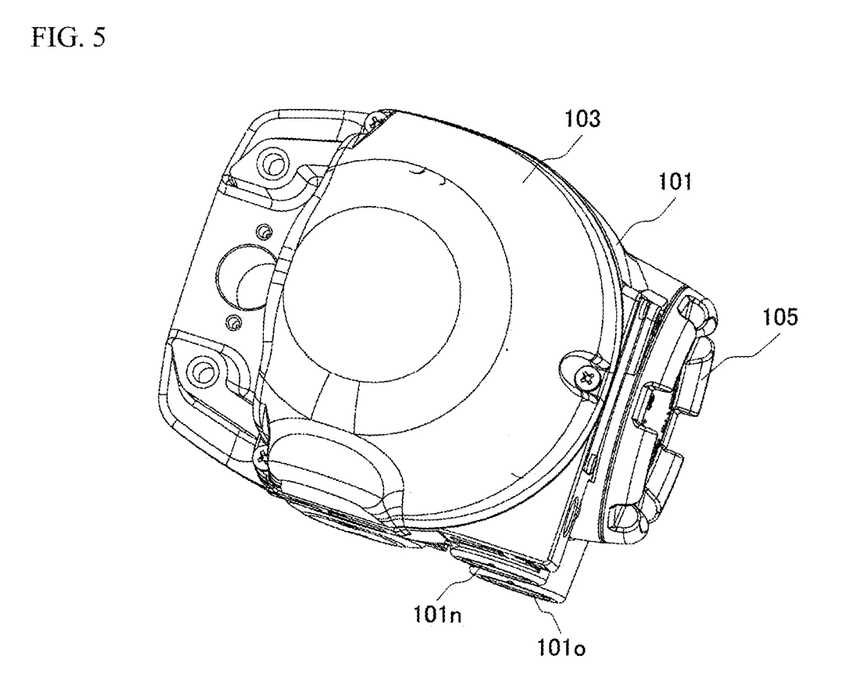
FIG. 5 is a diagram wherein the positioner, illustrated in FIG. 1, is viewed from the back.
Figure 6:
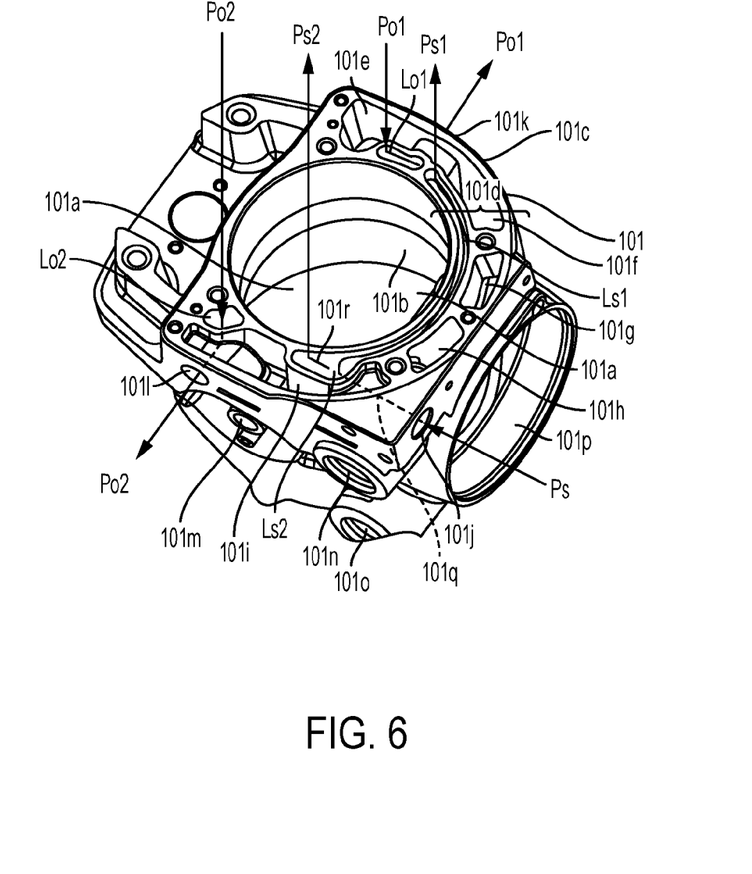
FIG. 6 is a diagram illustrating the explosion proof container of the positioner alone, viewed from the back.

FIG. 5 shows a diagram showing the positioner 100A, illustrated in FIG. 1, when seen from the back face side. FIG. 6 shows a diagram of the explosion proof container 101 of the positioner 100A alone, when viewed from this back face side. An interior space 101a is formed in the center portion of the explosion proof container 101, where flow paths for the air that is fed into the pilot relay 4 and air that is returned from the pilot relay 4 are formed in a thick portion (a trunk portion) 101d between the inner wall face 101b and the outer wall face 101c of the explosion proof container 101 that encompasses, in a ring shape, the surrounding of the interior space 101a.

In this example, a flow path Ls1 through which air of the supply air pressure Ps1 flows, a flow path Ls2 through which air of the supply air pressure Ps2 flows, a flow path Lo1 through which air of the output air pressure Po1 flows, and a flow path Lo2 through which air of the output air pressure Po2 flows are provided in the trunk portion 101d of the explosion proof container 101.

Note that 101e through 101i, and the like, are holes of gauging, where 101j is an inlet for air of the supply air pressure Ps, 101k is an outlet for air of the output air pressure Po1, 101l is an outlet for air of the output air pressure Po2, 101m is a discharge outlet for air within the explosion proof container 101, 101n and 1010 are conduits for routing electric wiring, and 101p is a chamber for housing a terminal block to which the wiring carried in the conduits 101n and 1010 is connected, where the chamber 101p that contains the terminal block is tightly closed by a cover 105 (FIG. 5) as a portion of the interior space of the explosion proof container 101.

In this explosion proof container 101, the flow path Ls1 through which flows the air of the supply air pressure Ps1 is a groove, with a depth of 10 mm, that is connected to the inlet 101j for the air of a supply air pressure Ps, formed along the inner wall face 101b of the explosion proof container 101. That is, the inner wall face 101b of the explosion proof container 101 has a ring shape, where the flow path Ls1 is formed as an arc-shaped groove along the ring-shaped inner wall face 101.

Figure 7:
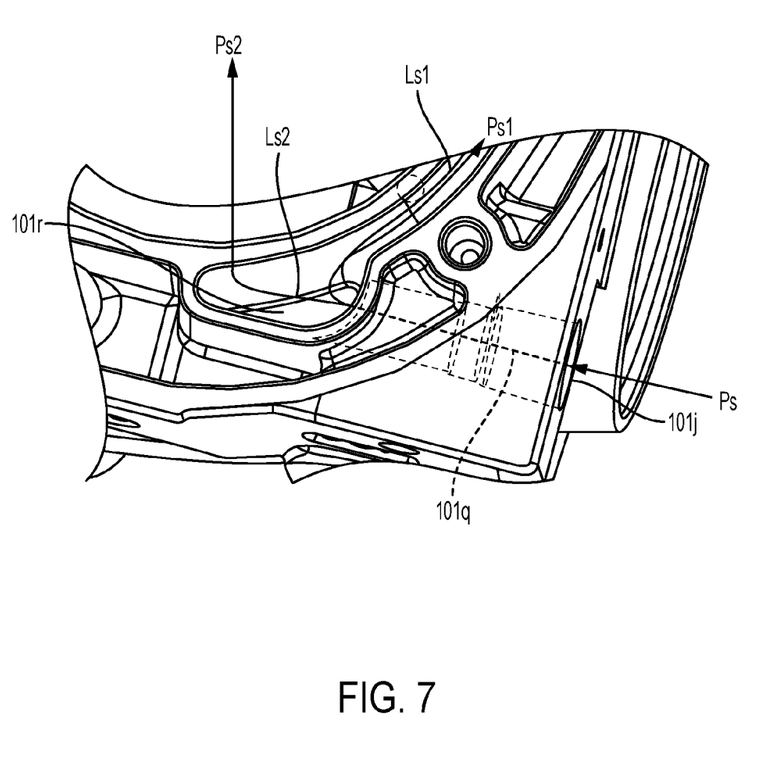
FIG. 7 is a diagram illustrating the air inlet portion for the supply air pressures Ps1 and Ps2 in the explosion proof container.
Figure 8:
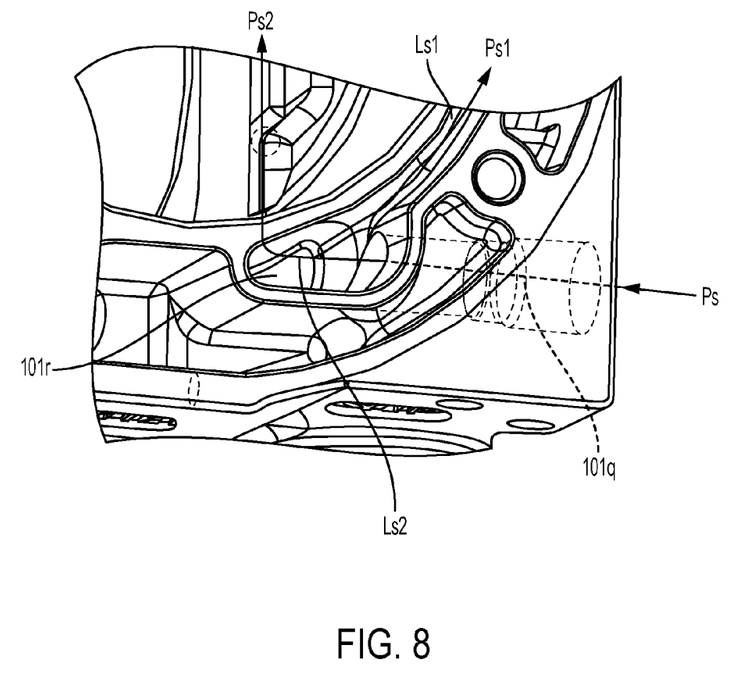
FIG. 8 is a diagram illustrating the air inlet portion for the supply air pressures Ps1 and Ps2 in the explosion proof container.

The air of the supply air pressure Ps, from the inlet 101j, as illustrated in FIG. 7 and FIG. 8, passes through a pipe-shaped straight line duct 101q that is connected to the inlet 101j, and then turns back at a sharp angle to enter into the arc-shaped flow path Ls1, to rise at a perpendicular at the end of this arc-shaped flow path Ls1 (referencing FIG. 9), to be sent to the pilot relay 4 as air of the supply air pressure Ps1. In this case, the air flows along the arc-shaped flow path Ls1, that is, the air flows along a smooth flow path with little curvature, so there is little variation in cross-sectional area, reducing the flow path resistance.

In the present invention, in the part of the flow path Ls1 wherein it bends back at a sharp angle, that is, at the part wherein the straight line duct 101q and the flow path Ls1 are joined, an air reservoir 101r with a depth of 30 mm is provided. This air reservoir 101r serves as a resonator, making it possible to reduce the flow path resistance through the effects of this chamber.

Furthermore, the air of the supply air pressure Ps from the inlet 101j rises at a perpendicular from this air reservoir (resonator) 101r, to be sent to the pilot relay 4 as air of the supply air pressure Ps2. The flow path through which the air of this supply air pressure Ps2 flows is the flow path Ls2. In this flow path Ls2 as well, the flow path cross-sectional area is secured by the air reservoir (resonator) 101r, to achieve a reduction in the flow path resistance.

Figure 9:
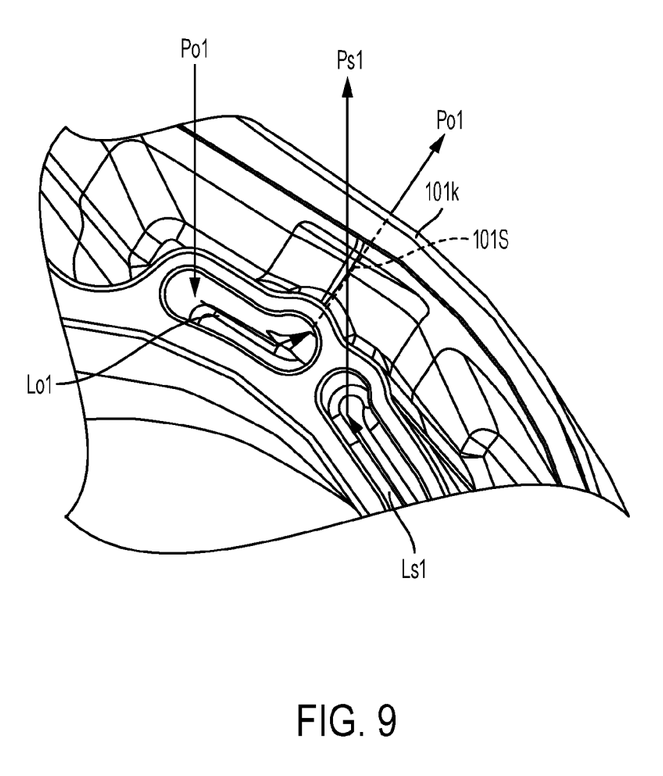
FIG. 9 is a diagram illustrating the air outlet portion for the output air pressure Po1 in the explosion proof container.
Figure 10:
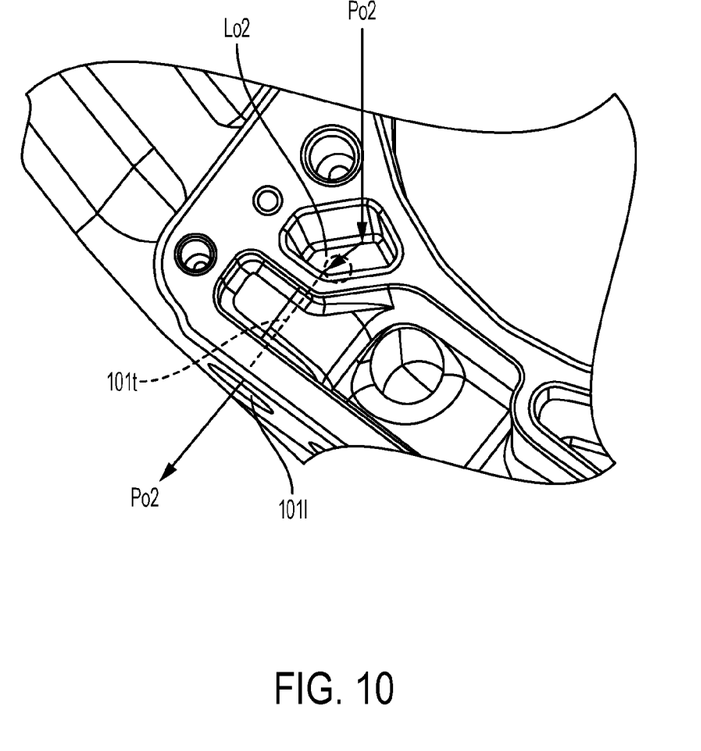
FIG. 10 is a diagram illustrating the air outlet portion for the output air pressure Po2 in the explosion proof container.

The air of the output air pressure Po1 from the pilot relay 4, as illustrated in FIG. 9, enters into the flow path Lo1, and passes through the outlet 101k to be fed to the regulator valve 200. Moreover, the air of the output air pressure Po2 from the pilot relay 4, as illustrated in FIG. 10, enters into the flow path Lo2, and passes through the outlet 101l to be fed to the regulator valve 200.

In this case, the output air pressure Po1 and Po2 from the pilot relay 4 turns back at a right angle to exit from the outlets 101k and 101l, and in order to cause the flow path resistance here to be extremely small, in the present example, the openings of the flow path Lo1 and Lo2, for the straight line paths 101s and 101t into the outlets 101k and 101l, are widened in stages, or the openings of these flow paths Lo1 and Lo2 are connected smoothly to the straight line paths 101s and 101t.

Moreover, in the present example, the explosion proof container 101 has a two-layer structure, due to the formation of the air flow paths in the thick portion (the trunk portion) 101d between the inner wall face 101b and the outer wall face 101c of the explosion proof container 101. As a result, the outer wall face 101c of the explosion proof container 101, as a portion of the outer shape of the positioner 100A, not only reduces the flow path resistance, but also increases the flexibility in the exterior visual design, making it possible to produce exterior visual designs of a distinctive streamlined shape that has not existed heretofore. Note that having a streamlined shape for the external shape of the positioner 100A produces the additional benefit of being able to get by with less installation space on the work floor.

Note that while in the example set forth above the positioner 100A was given an exterior visual design that had a streamlined shape, it need not, of course, be given an exterior visual design with a streamlined shape. Moreover, while in the example set forth above the inner wall face 101b of the explosion proof container 101 has a ring shape; that is, while all of the inner wall faces 101b are arc-shaped faces, this is not necessarily be all faces, but rather the flow path may be formed along the arc-shaped face by having only a portion of the inner wall face 101b have an arc-shaped face. Moreover, the shape may be one that uses many curved faces of free curve shapes, and the flow path may be formed along the curved faces of the free curve shapes.

Moreover, while in the example set forth above, an air reservoir (resonator) 101r was provided at the part of the flow path Ls1 wherein there was a bend at a sharp angle, providing a similar resonator either before or after a part wherein the flow path resistance is large, such as a part wherein there is a rapid change in cross-sectional area or a part wherein there is a small cross-sectional area, or a part wherein there is a perpendicular bend or a sharp angle bend in the air flow path provided in the trunk portion 101d of the explosion proof container 101, can achieve a reduction in the flow path resistance through securing the cross-sectional area of the flow path and through the use also of the chamber effects.

Extended Examples

While the present disclosure has been explained in reference to the above examples, the present disclosure is not limited to the examples set forth above. The structures and details in the present disclosure may be varied in a variety of ways, as can be understood by one skilled in the art, within the scope of technology in the present disclosure.

The invention claimed is:

1. A positioner for driving a regulator valve by converting an inputted electric signal into a pneumatic signal, comprising:
electronic circuitry configured to process electric signals;
an electropneumatic converter configured to convert, into pneumatic signals, electric signals that have been processed by the electric circuit module;
an explosion proof container configured to contain, in an interior space, the electric circuit module and the electropneumatic converter; and
a pneumatic amplifier, configured to be provided outside of the explosion proof container, that amplifies the pneumatic signal converted by the electropneumatic converter, wherein:
the explosion proof container comprises a two-laver structure and is formed with air flow paths for the air that is fed into the pneumatic amplifier and the air that is fed out of the pneumatic amplifier, in a thick portion between an inner wall face and an outer wall face of the container that encompasses the surrounding of the interior space;
the inner wall face is separate from the outer wall face and forms a gap in between;
the air flow paths are formed along an inner wall face of the explosion proof container; and
the inner wall face of the explosion proof container where on the air flow path is formed is arc-shaped or a shape that uses many curved faces of free curve shapes.

2. The positioner as set forth in claim 1, wherein:
the air flow path is provided with a resonator that reduces the flow path resistance before or after a part wherein the flow path resistance is large, such as a part with a sharp bend, a part wherein there is a rapid change in cross-sectional area, a part wherein there is a small cross-sectional area.

3. The positioner as set forth in claim 1, wherein:
the outer wall face of the explosion proof container serves as a portion of the outer shape of the positioner, and also is a portion of the outer wall of the air flow path, wherein:
the outer shape of the positioner is a streamlined shape or a shape that uses many spherical surfaces.

4. The positioner as set forth in claim 1, wherein:
the inner wall face of the explosion proof container comprises a ring shape.

* * * * *